US009996564B2

(12) United States Patent
Bhattacharjee et al.

(10) Patent No.: US 9,996,564 B2
(45) Date of Patent: *Jun. 12, 2018

(54) MANAGING DATABASE OBJECT PLACEMENT ON MULTIPLE STORAGE DEVICES

(71) Applicant: International Business Machines Corporation, Armonk, NY (US)

(72) Inventors: Bishwaranjan Bhattacharjee, Yorktown Heights, NY (US); Mustafa Canim, Dallas, TX (US); George Andrei Mihaila, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 237 days.

This patent is subject to a terminal disclaimer.

(21) Appl. No.: 14/849,744

(22) Filed: Sep. 10, 2015

(65) Prior Publication Data

US 2015/0379053 A1    Dec. 31, 2015

Related U.S. Application Data

(63) Continuation of application No. 12/423,247, filed on Apr. 14, 2009, now Pat. No. 9,165,021.

(51) Int. Cl.
*G06F 7/00* (2006.01)
*G06F 17/30* (2006.01)

(52) U.S. Cl.
CPC .. *G06F 17/30312* (2013.01); *G06F 17/30424* (2013.01); *G06F 17/30864* (2013.01)

(58) Field of Classification Search
CPC .................................. G06F 17/30312
USPC ......................................... 707/722
See application file for complete search history.

(56) References Cited

U.S. PATENT DOCUMENTS

| | | | |
|---|---|---|---|
| 4,974,156 A | 11/1990 | Harding et al. | |
| 5,644,766 A | 7/1997 | Coy et al. | |
| 7,328,325 B1 | 2/2008 | Solis et al. | |
| 7,386,679 B2 | 6/2008 | Franaszek et al. | |
| 7,707,351 B2 | 4/2010 | Bullen et al. | 711/5 |

(Continued)

OTHER PUBLICATIONS

Li, et al., "Load Balancing and Data Placement for Multi-Tiered Database Systems," Data Knowl. Eng. 62(3): 523-546 (2007).

(Continued)

*Primary Examiner* — James Trujillo
*Assistant Examiner* — John J Morris
(74) *Attorney, Agent, or Firm* — Fleit Gibbons Gutman Bongini Bianco PL; Jose Gutman

(57) ABSTRACT

A method, information processing system, and computer program storage product optimize the placement of database objects on a multiplicity of storage devices. A set of database objects are placed on a first storage device in a multiplicity of storage devices. Each storage device comprises differing characteristics. A query workload is run on the set of database objects that have been placed on the first storage device. Profiling information associated with the query workload that is running is collected. A subset of database objects is selected from the set of the database objects to be stored on a second storage device. The subset of database objects is stored on the second storage device and all remaining database objects in the set of database objects on the first storage device.

20 Claims, 10 Drawing Sheets

(56) References Cited

U.S. PATENT DOCUMENTS

2004/0088477 A1    5/2004   Bullen et al.
2006/0288036 A1   12/2006   Sadovsky et al.

OTHER PUBLICATIONS

Apers, Peter M.G., "Data Allocation in Distributed Database Systems," ACM Trans. Database Syst. 13(3): 263-304 (1988).
Lum, et al., "A Cost Oriented Algorithm for Data Set Allocation in Storage Hierarchies," Commun. ACM (CACM) 18(6):318-322 (1975).
Lee, et al., "A Case for Flash Memory SSD in Enterprise Database Applications," SIGMOD Conference 2008: 1075-1086.
International Search Report & Written Opinion dated Nov. 8, 2010 for International Application Serial No. PCT/US10/30856 filed Apr. 13, 2010.
Koltsidas, et al., "Flashing Up the Storage Layer", In Proceedings of the VLDB Endowment, Published Aug. 24, 2008, vol. 1, Issue 1, pp. 514-525, retrieved from: http://homepages.inf.ed.ac.uk/s0679010/mfdb.pdf.
Gramoli, "Distributed Shared Memory for Large-Scale Dynamic Systems", Published Nov. 2007; retrieved from http://citeseerx.ist.psu.edu/viewdoc/download?doi=10.1.1.104.1136&rep=rep1&type=pdf.
Koltsidas, et al. "Flashing Up the Storage Layer". In Proceedings of the VLDB Endowment, vol. 1, Issue 1, p. 514-525. Published Aug. 24, 2008. [Retrieved on Mar. 16, 2011]. Retrieved from the Internet: <URL: http://portal.acm.org/ft_gateway.cfm?id=1453913&type=pdf&coll=DL&dl=GUIDE&CFID=12648142&CFTOKEN=52738248>.

Solution to Object Placement Problem:

Given $\gamma$, c, n, C
for $j = 0$ to C do
   $v[0,j] \leftarrow 0$
end for
for $i = 1$ to n do
   $v[i,0] \leftarrow 0$
end for
for $i = 1$ to n do
   for $j = 1$ to C do
     if $c_i \leq j$ then
       $v[i,j] \leftarrow max\{\gamma_i + v[i - 1, j - c_i], v[i - 1, j]\}$
     else
       $v[i,j] \leftarrow v\{i - 1, j\}$
     end if
   end for
end for
return $v[n,C]$

FIG. 4

Finding the Set of Objects in an
Optimal Placement Solution:

Given O, $\gamma$, c, n, C, v
$i \leftarrow n$
$j \leftarrow C$
$S \leftarrow$ empty set;
while $i > 0$ do
   if $v[i,j] \;!= v[i - 1, j]$ then
      $S \leftarrow S$ union $\{Oi\}$
      $j \leftarrow j - ci$
   end if
   $i \leftarrow i - 1$
end while return S

FIG. 5

| Object Name | Rand. Access Time (msec) | Occupied Space (MB) | Priority Values |
|---|---:|---:|---:|
| LINEITEM_DAT | 90118 | 23758.59 | 3.79 |
| ORDERS_DAT | 8242 | 5071.14 | 1.63 |
| SUPPLIER_DAT | 275728 | 46.56 | 5921.68 |
| CUSTOMER_DAT | 2039413 | 772.34 | 2640.55 |
| PART_DAT | 1381228 | 865.70 | 1595.50 |
| PARTSUPP_DAT | 101170 | 3632.72 | 27.85 |
| SUPPLIER_IX | 51225 | 5.45 | 9393.70 |
| PART_IX | 468373 | 108.77 | 4306.26 |
| PARTSUPP_IX | 212677 | 81.58 | 2607.03 |
| CUSTOMER_IX | 149978 | 537.25 | 279.16 |
| ORDERS_IX | 9695 | 815.70 | 11.89 |
| LINEITEM_IX | 22443 | 4029.34 | 5.57 |

FIG. 7

| Object Name | Rand. Access Time (sec) | Cumulative Rand. Time | Occupied Space (MB) | Cumulative Occupied Space (Knapsack Size) | Priority List |
|---|---|---|---|---|---|
| SUPPLIER_IX | 51.23 | 51 | 5.45 | 5 | 9393.70 |
| SUPPLIER_DAT | 275.73 | 327 | 46.56 | 52 | 5921.68 |
| PART_IX | 468.37 | 795 | 108.77 | 161 | 4306.26 |
| CUSTOMER_DAT | 2039.41 | 2835 | 772.34 | 933 | 2640.55 |
| PARTSUPP_IX | 212.68 | 3047 | 81.58 | 1015 | 2607.03 |
| PART_DAT | 1381.23 | 4429 | 865.70 | 1880 | 1595.50 |
| CUSTOMER_IX | 149.98 | 4579 | 537.25 | 2418 | 279.16 |
| PARTSUPP_DAT | 101.17 | 4680 | 3632.72 | 6050 | 27.85 |
| ORDERS_IX | 9.70 | 4689 | 815.70 | 6866 | 11.89 |
| LINEITEM_IX | 22.44 | 4712 | 4029.34 | 10895 | 5.57 |
| LINEITEM_DAT | 90.12 | 4802 | 23758.59 | 34654 | 3.79 |
| ORDERS_DAT | 8.24 | 4810 | 5071.14 | 39725 | 1.63 |

MANAGING DATABASE OBJECT PLACEMENT ON MULTIPLE STORAGE DEVICES

FIELD OF THE INVENTION

The present invention generally relates to the field of database management systems, and more particularly relates to managing the placement of database objects on multiple storage devices each having different performance characteristics.

BACKGROUND OF THE INVENTION

The storage devices currently employed by database management systems ("DBMS") have a wide range of performance characteristics with respect to sequential and random data access. For example, solid state disks ("SSD") provide much faster random access time to data compared to hard drives ("HDD"). For a given database workload, some database objects (tables, indexes, materialized views, etc.) are accessed in a random fashion more than others. The relative performance of sequential data access of the various devices is also important. In a DBMS with access to both HDD and SSD storage devices, a database administrator needs to decide on which device to place each object such as to optimize the performance. Under storage capacity constraints, it may not be possible to place the entire database on the fastest device. Also, faster devices are usually more expensive, so there is an inherent tradeoff between price and performance. A Data Base Administrator (DBA) might use heuristics such as placing indexes on SSD devices and the data on HDD drives. However, these approaches generally cannot guarantee the best performance for a given budget.

SUMMARY OF THE INVENTION

In one embodiment, a method for optimizing placement of database objects on a plurality of storage devices is disclosed. The method includes placing a set of database objects on a first storage device in a plurality of storage devices. Each storage device in the plurality of storage device comprises differing characteristics. A query workload is run on the set of database objects that have been placed on the first storage device. Profiling information associated with the query workload that is running is collected. A subset of database objects is selected from the set of the database objects to be stored on a second storage device in the plurality of storage devices based on the profiling information that has been collected. The subset of database objects is stored on the second storage device and all remaining database objects in the set of database objects on the first storage device.

In another embodiment, an information processing system for optimizing placement of database objects on a plurality of storage devices is disclosed. The information processing system includes a memory and a processor that is communicatively coupled to the memory. A database object placement advisor is communicatively coupled to the memory and the processor. The database object placement advisor is adapted to place a set of database objects on a first storage device in a plurality of storage devices. Each storage device in the plurality of storage device comprises differing characteristics. A query workload is run on the set of database objects that have been placed on the first storage device. Profiling information associated with the query workload that is running is collected. A subset of database objects is selected from the set of the database objects to be stored on a second storage device in the plurality of storage devices based on the profiling information that has been collected. The subset of database objects is stored on the second storage device and all remaining database objects in the set of database objects on the first storage device.

In yet another embodiment, a computer program storage product for optimizing placement of database objects on a plurality of storage devices is disclosed. The computer program storage product includes instructions for placing a set of database objects on a first storage device in a plurality of storage devices. Each storage device in the plurality of storage device comprises differing characteristics. A query workload is run on the set of database objects that have been placed on the first storage device. Profiling information associated with the query workload that is running is collected. A subset of database objects is selected from the set of the database objects to be stored on a second storage device in the plurality of storage devices based on the profiling information that has been collected. The subset of database objects is stored on the second storage device and all remaining database objects in the set of database objects on the first storage device.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 4 is pseudo code that illustrates an algorithm for determining the optimal placement for database objects according to one embodiment of the present invention;

FIG. 5 is pseudo code that illustrates an algorithm for determining the set of database objects according to the optimal placement solution determining by the algorithm in FIG. 4 according to one embodiment of the present invention;

FIG. 7 is a table comprising the total random access times, sizes, and calculated priority values for a set of database objects according to one embodiment of the present invention;

FIG. 8 is a table comprising the set of database objects from FIG. 7 sorted by their calculated priority value according to one embodiment of the present invention;

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and other similar terms as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Operating Environment

Figure 1:
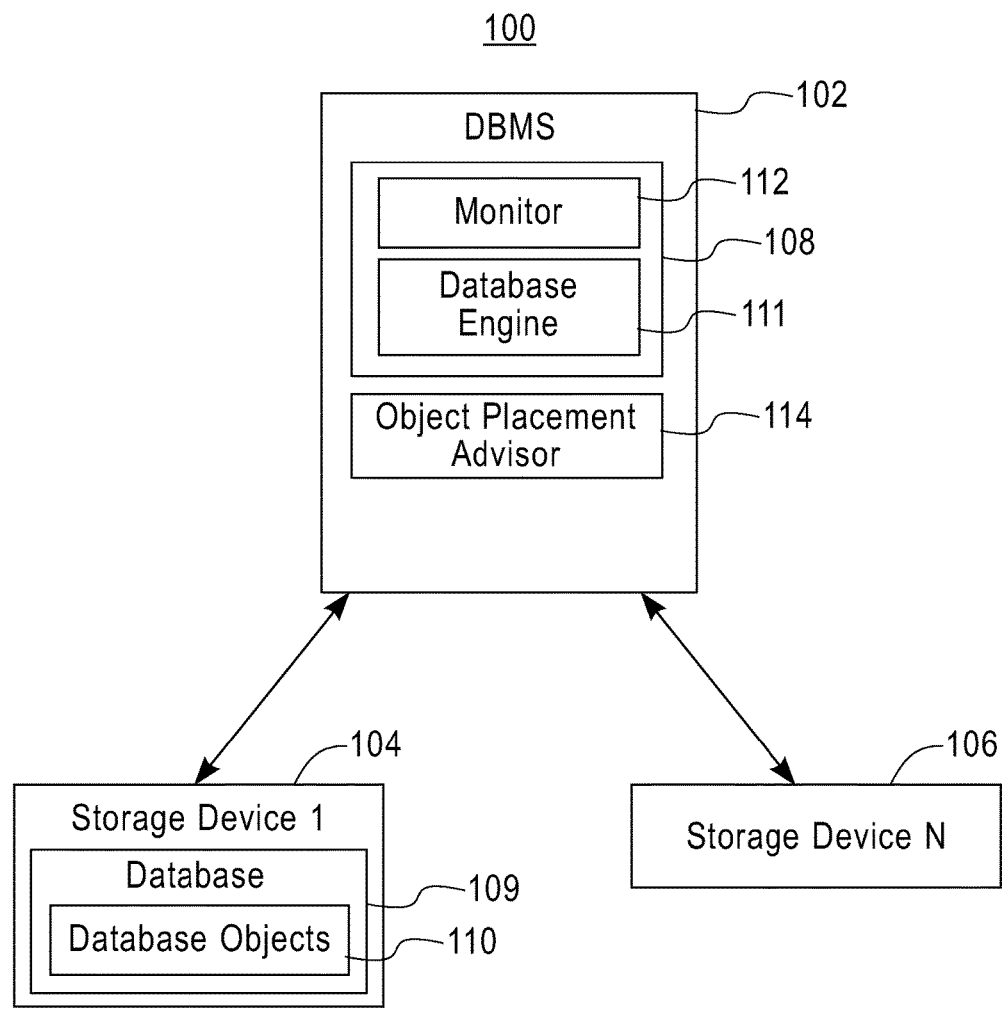
FIG. 1 is a block diagram illustrating an exemplary system according to one embodiment of the present invention.

According to one embodiment of the present invention, as shown in FIG. 1, a system 100 for managing database object placement on storage devices with differing characteristics is shown. In one embodiment, the system 100 includes one or more information processing systems 102 communicatively coupled to one or more storage devices 104, 106. In one embodiment, the information processing system comprises a database management system ("DBMS") 108. The DBMS 108, in one embodiment, is a hybrid relational-XML DBMS such as the IBM DB2 9 with optimized management of both relational and XML data. However, the various embodiments of the present invention are not limited to such a DBMS system.

The DBMS 108 manages one or more databases 109 comprising a plurality of database objects 110, which can be physical or logical, such as (but not limited to) storage containers, table spaces, tables, indexes, and materialized views. These database objects 110 can reside on one or more of the storage devices 104, 106, which can be a combination of hard disk drives ("HDDs") and solid state disks ("SSDs"). The DBMS 108, in one embodiment, includes a DATABASE ENGINE 111 and a monitoring module 112 that collects and reports detailed information about all physical input/output activity during the execution of a given workload. Examples of such information are the number and duration of all synchronous and asynchronous read and write operations for the database objects 110. This information is transmitted to an Object Placement Advisor ("OPA") module 114 that also resides within the information processing system 102 and can be part of or external to the DBMS 108.

The OPA 114 analyzes the data received from the monitoring module 112 and determines an allocation of database objects to physical devices that provides the best projected performance. Stated differently, the OPA 114 analyzes physical input/output activity associated with database objects and optimally selects which database objects are to be placed on one storage device type such as HDDs and which database objects are to be placed on other storage device types such as SSDs. The OPA 114 is discussed in greater detail below. It should be noted that one or more of the components shown residing within the information processing system 102 can reside one or more different information processing systems communicatively coupled to the system 102. Also, the storage devices 104, 106 can either reside within the information processing system, within different information processing systems, can be externally attached to the system 102 (or other systems), or can be stand alone units.

Managing Database Object Placement on Storage Devices with Differing Characteristics SSDs have been introduced by a number of vendors in the last few years. SSDs provide persistent data storage using a form of solid-state flash memory. To the operating system, SSDs appear just like a conventional disk device. Unlike hard disks, which have a mechanical latency associated with seeks and rotation, there is a very small overhead for random access to data relative to sequential access. As a result, a solid state disk can support one to two orders of magnitude more random I/O operations per second than a hard disk. (See, for example, G. Graefe, "The five minute rule twenty years later, and how flash memory changes the rules", DaMoN 200 and S. W. Lee, B. Moon, "Design of flash-based dbms: an in-page logging approach", SIGMOD 07, which are both hereby incorporated by reference in their entireties).

Currently, SSDs are more expensive than traditional hard disks when measured in gigabytes per dollar, or in terms of sequential I/Os per second per dollar. However, SSDs provide better value than hard disks if one measures random I/Os per second per dollar. (See, for example, G. Graefe, "The five minute rule twenty years later, and how flash memory changes the rules", DaMoN 2007, which is hereby in corporated by reference in its entirety). Thus, SSDs provide an opportunity to improve the performance of a system if it typically incurs a large number of random I/O. At the same time, one does not typically want to place all of one's data on SSDs, because the cost per gigabyte is higher than on a hard disk. Ideally, one should put "just enough" data on SSD storage so that a large fraction of the potential random I/O savings can be realized. Beyond a certain point, the marginal gains in random I/O saving may be small, and outweighed by the increased cost of the extra SSD devices.

The OPA 114 discussed above determines which database objects (tables, indexes, materialized views, etc.), if placed on the SSD, would most improve the performance of the system. Therefore administrators can determine how many SSDs should be purchased to most efficiently and optimally improve their system performance; how much and which data should be placed on existing SSDs; what performance gains will be obtained; and which aspects of SSD performance are most crucial.

Current cost-based query optimizers can take account of disk characteristics in order to estimate execution times.

However, until now, disk characteristics within a single installation have typically been relatively uniform. Thus, there has been little need for a database utility to consider the various options for data placement. Even if a query optimizer is intelligent enough to distinguish between sequential and random I/Os, there are numerous run-time issues that make these estimates extremely rough. For example, caching of data in the buffer pool can radically alter the profile of physical data accesses.

While a database administrator may have access to certain kinds of run-time performance data about queries, such data is relatively difficult to gather systematically without support from a database utility. Further, performance data typically does not associate I/O behavior with data objects within a query. Thus, it is generally not possibly to apportion the performance numbers of a query to the individual objects (tables, indices, materialized views, etc.) used by the query.

The various embodiments of the present invention, on the other hand, overcome these difficulties so that a database administrator can make informed decisions about object placement, and make good use of limited SSD resources. For example, the Placement Advisor 114 gathers run-time statistics on I/O behavior from a running installation using only a storage device of a first type 104 such as hard disk. By creating a benchmark installation in which each object is in its own tablespace, the Placement Advisor 114 is able to gather information about the random I/O behavior of each object without modifying the database engine code. The application workload is profiled in this benchmark installation to gather statistics for each database object.

Based on these statistics, the Placement Advisor 114, in one embodiment, determines which objects provide the "best bang for the buck" by ranking them according to the number of random I/Os divided by the size of the object. A greedy heuristic can be used to choose the highest-ranked objects one by one (in rank order) until no more objects fit within a given SSD space budget. These chosen objects are the candidates for placement on the SSD device. A variety of configurations with can be created with different space-time trade-offs by varying the SSD budget. It is common practice to use only a small fraction of a physical hard disk for database data (typically just the outer tracks) so that seek times are small. (See, for example, J. A. Nugent, A. C. Arpaci-Dusseau, R. H. Arpaci-Dusseau, "Controlling your place in the file system with gray-box techniques", USENIX 03, which is hereby in corporated by reference in its entirety). If additional space is needed, a performance-sensitive DBA might choose to buy an extra hard disk rather than use the remaining space on existing disks. That way, each disk still has shorter seek times, and multiple disk heads can be seeking in parallel (If the DBA does this, then the cost of an SSD might actually be competitive per "useful" gigabyte with the cost of a hard disk.) In this context, using an SSD for randomly accessed data can have secondary cost benefits. By moving the randomly accessed data to the SSD, the hard disks are left with data that tends to be accessed sequentially. As a result, it might be possible to use more tracks of each disk without incurring substantial extra seek time, and fewer disks would be needed.

In modern databases, storage characteristics are specified while creating the tablespaces so as to help the query optimizer choose a better query execution. (See, for example, IBM DB2 Database for Linux, UNIX and Windows Information Center, which is hereby in corporated by reference in its entirety.). For instance, a query could be executed with RID list fetch plan if the storage device has very small average latency whereas the same query could have been executed with a table scan plan on a device with a higher average latency. Since the placement advisor considers the estimates from the profiling phase where the objects are placed on the HDD, the total execution times may not exactly match the expected execution times after the objects are moved to the SSD. Due to the changes in the plans, the workload execution may take shorter or longer than what is expected.

The Placement Advisor 114 could also be used to estimate and compare the performance benefits if different SSD devices are considered to be purchased. Nowadays, there are so many different SSD products in the market. The major distinction between these products is the interface that is used to connect the devices to the servers. Some of these options are: Fibre-channel, parallel SCSI, Parallel ATA, Bus (includes PCI, PMC, SBus, VME etc), Serial Attached SCSI ("SAS"). (See, for example, Z. Kerekes, "The ssd buyer preferences market report", which is hereby in corporate by reference in its entirety). Although it seems advantageous to have plenty of options, it may not be easy to determine which option is better suited for a specific system. This is because for each device the cost to provide data throughput for random and sequential reads and writes will exhibit huge variation.

Figure 2:
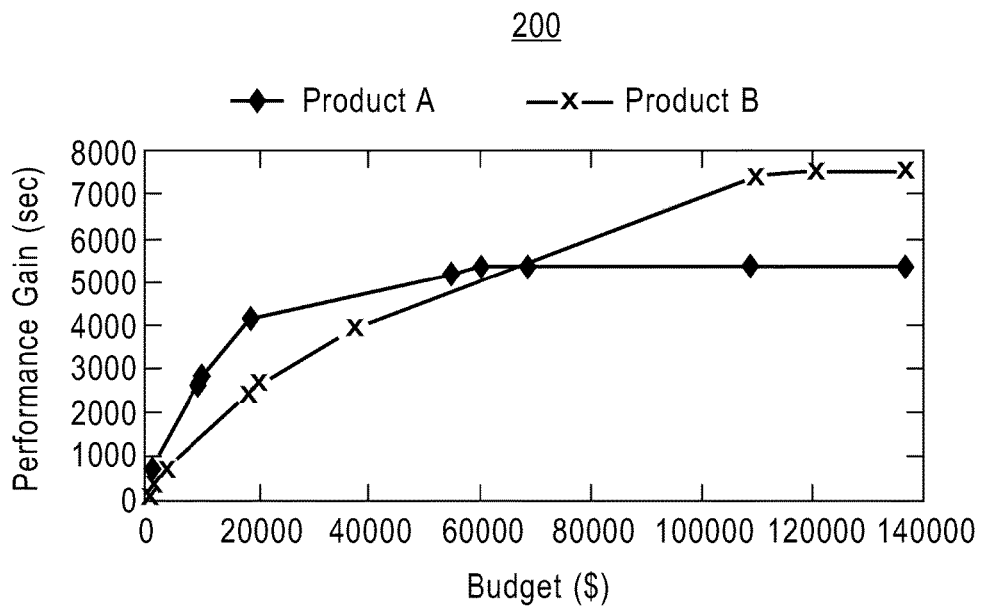
FIG. 2 is a graph illustrating performance comparison of different solid state devices according to one embodiment of the present invention.

Consider the following scenario in which the Object Placement Advisor proves helpful in comparing different SSD products. Suppose two alternative SSD devices with specifications given below are under consideration for improving the performance of a database management system. Product B provides 5 times faster sequential access compared to Product A, while the random access speed of Product A is twice as that of Product B. As for the price per GB of storage, Product B is twice as expensive as Product A. Given these specifications, the OPA 114 yields the chart 200 shown in FIG. 2 after collecting profiling results of a workload running in the DBMS. If the budget is less than $60,000, then purchasing Product A would be a cost effective decision since it provides more improvement relative to B with the same amount of budget. If an administrator has an SSD budget of $100,000 or more, then Product B would be preferred since the total performance gain of purchasing more space of Product A would be less. With the help of this chart 200, one can determine which product minimizes cost and thus provides a higher utility.

The following is a brief discussion on the impact of disk access behavior on response time. Objects are accessed sequentially when the execution of a query needs a table scan due to lack of indexes on query attributes. During the evaluation of these queries, when the first page request is issued to the disk controller, the disk arm is positioned over the correct track. The time for moving the arm is called "Seek Time" which increases with the distance that the arm must move. After reaching the desired track, the head waits for the sector to appear under it as the disk rotates and this time is called "Rotational Latency" or "Rotational Delay". (See, for example, Raghu Ramakrishnan, Johannes Gehrke. Database Management Systems. Third Edition. McGraw Hill, New York, 2003, ISBN 0-07-246563-8", which is hereby in corporate by reference in its entirety). Once these steps are completed, the disk head starts reading the consecutive sectors from the track. As long as the objects are accessed sequentially, these initial mechanical movements do not cause a considerable amount of latency. During sequential disk access the only latency is the transfer time which is a constant time specific to a certain storage device.

Figure 3:
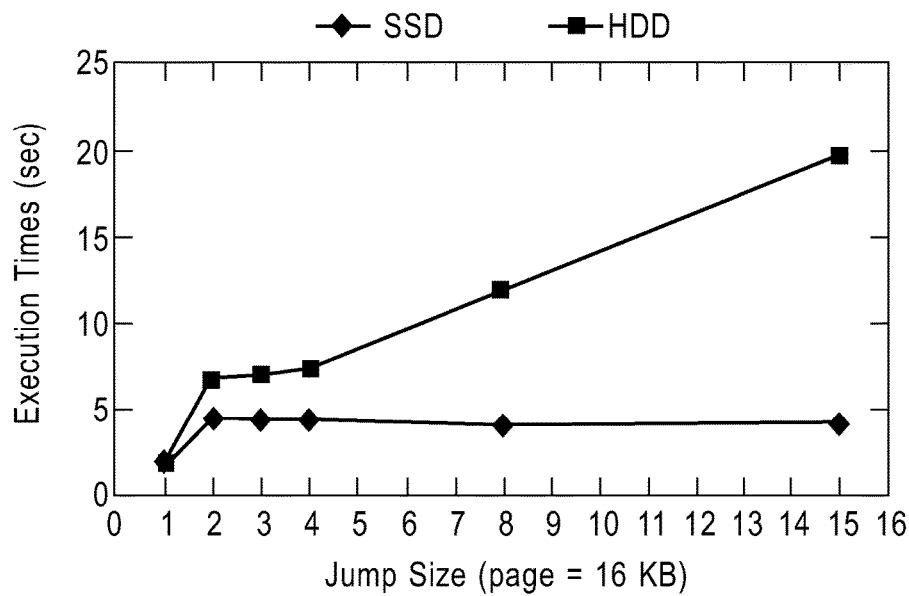
FIG. 3 is a graph illustrating execution times with respect to jump sizes according to one embodiment of the present invention.

On the other hand, frequent random accesses on the hard drives exacerbate the response time because each page request causes extra seek time and rotational latency. Since there are not any mechanical movements in SSDs, moving the objects that are mostly accessed randomly to the SSD provides dramatically improvement. To verify this, the following experiments were conducted. To observe the impact of mechanical movements on data retrieval cost consider a simple application that reads 160 MB of data in total from a 6 GB file. Given an input argument κ=3, the application reads the 160 MB of data with jumps between two consecutive accesses where the jump size is computed as κ×16 KB. For instance if κ=3, the application reads 16 KB data chunks from the offsets κ, κ+(3*16 KB), κ+(6*16 KB), κ+(9*16 KB), . . . of the file where κ is the file offset of the first read page. At each run, increasing jump sizes were provided and measured the execution times on both the HDD and SSD. As the results in shown in FIG. 3 indicate, the page retrieval cost on the HDD depends on the distance between each page request while the retrieval cost is independent of the jump size on the SSD since there is no mechanical movement.

The objective of the second experiment was to observe the impact of disk access behavior on query response time in a conventional database management system. Using IBM DB2, two databases were created one on the HDD and the other on the SSD using the TPC-H schema. (See, for example, TPCH, Decision Support Benchmark, ([http://www.tpc.org/tpch])", which is hereby in corporate by reference in its entirety). After running the TPC-H queries it was observed that the execution times are almost identical. The execution plans of these queries require a lot of table scans, which means that none of the objects is accessed randomly. In the second part of the experiment, we prepared a workload of index access queries and observed that the execution of the workload on the SSD is 6 times faster than the execution on the HDD.

The disadvantage of an SSD relative to an HDD is that the former offers the same amount of storage space at a significantly higher cost. For instance, currently, an SSD device with a storage capacity of 160 GB costs more than $1000 whereas an HDD device with the same amount of storage capacity costs less than $50. The price disadvantage would be more pronounced in large database systems in case that all HDDs were replaced with SSDs. Therefore, using a hybrid storage system with a smart object placement strategy, would be a cost effective decision. However, identifying the most randomly accessed objects in a database would be a challenging task. Even moderate sized projects today involve hundreds of objects such as tables, indexes and MQTs.

The OPA 114 can help database administrators to identify the most randomly accessed objects of the database and to predict the amount of improvement by moving these objects to a specific SSD device. With the help of this technique the database administrators can decide whether moving certain objects would be enough to boost the system performance. The OPA 14 either implemented as a tool within database systems or even outside the engine, simplifies making this decision by monitoring the retrieval cost of pages to the buffer pool. A naive approach would suggest moving the indexes of database objects to the SSD as the indexes are usually accessed randomly. This would be a practical and cost effective solution that does not require any monitoring tool or profiling input. However, our experiments indicate that not only the indexes but also the data parts of the relations are accessed randomly in most cases. Therefore, making the decision of object placement considering the profiling input will provide a better performance gain with the same amount of SSD usage.

On the other hand OPA 114 can also be used in database management systems where the flash memory is used as a new storage layer between the memory and the storage device. In this case, moving the most randomly accessed objects that occupy the least amount of space to this third layer storage device could provide a dramatical improvement. The monitoring techniques and the object placement approach of the OPA 114 work can be used to employ a smart placement strategy in these types of applications and other types of applications as well.

In one embodiment, the Object Placement Advisor 114 can be used as an offline and/or on-line tool. The method for obtaining an optimal placement strategy, in one embodiment, comprises two phases: (1) a profiling phase and (2) a decision phase. Based on the collected run time statistics phase, the estimated performance gain from moving each object from the current storage device such as an HDD to an SSD is determined. Later on, these estimates are used in the decision phase to suggest an object placement plan.

The database environment, where the Object Placement Advisor 114 is used has been shown in FIG. 1, where a DBMS processes the incoming queries of a workload. The database includes hundreds of tables, MQTs (materialized views), and indexes created on multiple tablespaces. Initially, these tablespaces are created on HDDs. On top of this storage system there is a database engine 11 processing the queries and transactions coming from user applications. A monitoring tool 112 attached to the database engine measures the time spent for both reading the pages from the storage device to the buffer pool and writing the dirty pages back to the disk. These measurements are sent to the OPA 114 as a feedback for evaluation. Having this profiling input, the OPA 112 prepares a list of objects sorted by their priority values to be moved to the SSD. Using this priority list, the database administrator determines the amount of SSD space to be purchased and moves the objects from the HDD to the SSD accordingly.

One goal of the profiling phase is to collect profiling information about the disk access costs for each database object during the execution of a query workload. This information includes the number of physical disk accesses such as sequential and random reads and writes and average page access costs for different objects. A snapshot utility such as IBM DB2's snapshot utility can be used to collect the profiling data in the table space. (See, for example, IBM DB2 Database for Linux, UNIX and Windows Information Center, ([http://publib.boulder.ibm.com]), which is hereby incorporated by reference in its entirety). Using this utility, one can monitor activities on all buffer pools, tablespaces, and locks etc. Some of the parameters included in a typical output of a buffer pool snapshot is given in Table 1 below.

TABLE 1

Bufferpool name = IBMDEFAULTBP
Database name = TPCH
Snapshot timestamp = 07/17/2008 12:19:14.265625
Buffer pool data logical reads = 98
Buffer pool data physical reads = 27
Buffer pool temporary data logical reads = 0
Buffer pool temporary data physical reads = 0
Buffer pool data writes = 2
Buffer pool index logical reads = 214
Buffer pool index physical reads = 91
Buffer pool temporary index logical reads = 0
Buffer pool temporary index physical reads = 0
Total buffer pool read time (ms) = 947
Total buffer pool write time (ms) = 3
Asynchronous pool data page reads = 0

TABLE 1-continued

Asynchronous pool data page writes = 0
Buffer pool index writes = 0
Asynchronous pool index page reads = 0
Asynchronous pool index page writes = 0
Total elapsed asynchronous read time = 0
Total elapsed asynchronous write time = 0
Asynchronous data read requests = 0
Asynchronous index read requests = 0

These parameters are used by the OPA 114 to measure the average sequential and random disk access costs of the pages pertaining to the objects, which is discussed in greater detail below. The parameters obtained from the snapshot report can be used to find the cost of sequential accesses. Whenever the pages of an object need to be read sequentially from the disk, DB2 uses prefetchers which issue asynchronous read and write requests. Agents of the application send these asynchronous requests to a common prefetch queue. As prefetchers become available, they fulfill these requests to fetch the requested pages from the disk into the buffer pool. (See, for example, IBM DB2 Database for Linux, UNIX and Windows Information Center, ([http://publib-.boulder.ibm.com]), which is hereby in corporate by reference in its entirety). Therefore, asynchronous access parameters can be used to find the sequential read and write costs for the ith table space. Total elapsed asynchronous read time in Table 1 represents the total time spent for sequential read operations. Asynchronous pool data page reads, on the other hand, provides the number of pages of a data object read sequentially. Dividing the first parameter to the second yields the Average sequential access cost of a page for a data object. For index objects the same method is applied except that Asynchronous pool data page reads is replaced with Asynchronous pool index page reads. For write operations, a similar methodology is applied for both data and index objects.

DB2 does synchronous I/O requests wherever it is not able to make the requests asynchronously (i.e. the range of the pages to be retrieved is relatively small). Therefore, synchronous access costs can be used to measure the total random access cost for both data and index objects. The buffer pool snapshot report does not include the synchronous I/O costs and the number of synchronous page accesses. However, these parameters can be computed using other parameters listed in Table 1.

Total random read cost of the pages of an object is computed by subtracting Total elapsed asynchronous read time from Total buffer pool read time. This is applicable to the index objects as well as the data objects. By subtracting Asynchronous pool data page reads from Buffer pool data physical reads, the OPA 114 obtains Synchronous pool data page reads which is the number of pages read randomly from the disk for the data objects. To compute the same parameter for the index objects, Asynchronous pool index page reads are subtracted from Buffer pool index physical reads.

To obtain the Average random access cost of a page for a data object, Total elapsed synchronous read time, is divided by Synchronous pool data page reads. The same procedure is repeated to compute the Average random access cost of a page for an index object. For all write related parameters, the same procedure is applied by replacing the read related parameters with write related parameters.

Once the profiling phase is completed, the profiling results including the number of physical page accesses and the average page access costs are forwarded to the OPA 114 to make the object placement decision. By considering the profiling data, first, the estimated improvements (gains) for each object are computed. Later on, the OPA 114 prepares a priority list to determine which objects have the highest priority to be moved to the SSD. In the decision phase, a greedy knapsack heuristic is used, in one embodiment, to determine the priority values.

Moving the ith object from the HDD to the SSD provides $\gamma_i$ units of estimated improvement in terms of response time, which is also called "gain of the ith object". In estimation of $\gamma_i$ we use average page access costs obtained in the profiling phase. Suppose that $\alpha_{HDD}^R(i)$ is the average page read cost of the ith object when the object is on the HDD. $\alpha_{SDD}^R$ is the average random page access cost of an object when the object is placed on the SSD. By computing $\alpha_{HDD}^R(i) - \alpha_{SDD}^R$ the expected time difference between reading a page randomly from the HDD and the SSD is obtained. By multiplying this quantity with the number of randomly read pages, the estimated total improvement from moving the ith object to the SSD that comes from the random reads is obtained. This computation is repeated for sequential reads, sequential writes, and random writes. The summation of these estimated gains yields the total improvement that can be obtained by moving the ith object to the SSD.

Note that $\alpha_{SSD}^R$ is a device specific parameter (i.e. it could be different for different SSD products). $\alpha_{SSD}^R$ is computed by dividing the page size of the tablespace created in the database to the sequential read throughput that the device supports. For instance, if the sequential read throughput of the SSD device is 80 MB/s, and the page size is 16 KB then $\alpha_{SSD}^R$ SSD would be 16/(80*1024) seconds which is equal to 0.195 milliseconds. For random reads and writes, the average latency costs should be added to the transfer time to find the expected random access times of the pages. Table 2 below includes the buffer pool access cost of the objects created in the TPC-H experiment databases.

TABLE 2

| Object Name | Bufferpool Access Time (msec) | Estimated Gain (msec) | Space Require-Mint (MB) | Priority Value |
| --- | --- | --- | --- | --- |
| PART_DAT | 1492096 | 1314731 | 856.703 | 1518.686 |
| SUPPLIER_DAT | 304233 | 263924 | 46.563 | 5668.171 |
| PARTSUPP_DAT | 4091521 | 1015276 | 3632.719 | 279.481 |
| CUSTOMER_DAT | 2039413 | 1903452 | 772.344 | 2464.514 |
| ORDERS_DAT | 16716 | 9648 | 5071.141 | 1.903 |
| LINEITEM_DAT | 97456 | 85804 | 23758.59 | 3.611 |
| PART_IX | 493267 | 442893 | 108.766 | 4071.993 |
| SUPPLIER_IX | 51225 | 47810 | 5.453 | 8767.450 |
| PARTSUPP_IX | 212758 | 198517 | 81.578 | 2433.461 |
| CUSTOMER_IX | 149978 | 139979 | 537.250 | 260.548 |
| ORDERS_IX | 9695 | 9049 | 815.703 | 11.093 |
| LINEITEM_IX | 22443 | 20947 | 4029.344 | 5.199 |

The first column shows the object name being considered. The second column shows the buffer pool access time in milliseconds. The third column in the table indicates the total estimated improvement by moving each object to the SSD. The fourth column shows the space required by each object. The fifth column shows a priority value determined by the OPA 114 for each of the objects. Based on these gains and space requirements of the objects, a knapsack based solution, in one embodiment, is applied to determine which objects should be moved to the SSD. Dynamic programming techniques can be used for the applications where the flash memory is used as a cache between memory and hard disk (as discussed above). In this scenario, the objective is to find the best object placement strategy that maximizes the performance in a space limited environment.

The greedy technique, on the other hand, can be used in resource planning scenarios in very large databases. Throughout this discussion the primary focus is on the problem of determining the minimum amount of SSD space that would be purchased to maximize the system performance. Suppose that there exists a database with n objects $\varphi=\{O_1, O_2, K, O_n\}$ where moving the ith object from the HDD to the SSD provides $\gamma_i$ units of estimated improvement in terms of disk access cost. The storage cost of the ith object is $c_i$. The objective is to maximize the total improvement by moving certain objects to the SSD under the constraint of C units of SSD space.

Let $K_{i,W}=\{O_1, O_2, K, O_n: c\}$ $K_{n,W}=\{O_1, O_2, K, O_n: C\}$ denote 0-1 knapsack problem. Let a subset S of objects be optimal for $K_{n,C}$ and $O_i$ be the highest numbered object in S. Then $S'=S-\{O_i\}$ is an optimal solution for subproblem $K_{i-1,W-c_i}=\{O_1, O_2, K, O_n: C-c_i\}$ with $v(S)=\gamma_i+v(S')$ where $v(*)$ is the value of an optimal placement "*" (i.e. the total improvement that can be obtained using that placement plan).

Then a recursive definition for the value of optimal solution is as follows:

Define $v\{i,c\}$ as the value of an optimal solution for $K_{i,W}=\{O_1, O_2, K, O_n: c\}$.

$$v[i, c] = \begin{cases} 0, & \text{if } i = 0 \text{ or } c = 0 \\ v[i-1, c], & \text{if } c_i \geq c \\ \max\{\gamma_i + v[i-1, c - c_i] & \\ v[i-1, c]\}, & \text{Otherwise,} \end{cases}$$

This recurrence shows that an optimal solution $S_{iC}$ for $K_{iC}$ either contains $O_i$ (i.e. $v[i, c]=\gamma_i+v[i-1, c-c_i]$) or does not contain $O_i$ (i.e. $v[i, c]=v[i-1, c]$). If the object $O_i$ is picked to be moved to the SSD, the gain will be $\gamma_i$ and then another object can be picked from $\{O_1, O_2, K, O_{i-1}\}$ up to the storage limit $c-c_i$ to get the improvement $v[i-1, c]$. If the object $O_i$ is not picked, an object from $=\{O_1, O_2, K, O_{i-1}\}$ up to the weight limit c, can be picked to get the improvement $v[i-1, c]$. The better of these two choices, in one embodiment, is made.

Based on the recursive definition described above, the algorithm illustrated by the pseudo code in FIG. 4 outputs a matrix $v[n, C]$ with dimensions $(n+1)\times(C+1)$ that can be used to find an optimal placement solution. The algorithm takes as input the number of objects n, the maximum SSD space C, array $\gamma=\{\gamma 1, \gamma 2, K, \gamma_i\}$ (gain of the objects) and array $c=\{c_1, c_2, K, c\gamma_i\}$ (storage cost of the objects). The run time of this algorithm, in one embodiment, is $T(n)=O(nC)$.

The algorithm described by the pseudocode in FIG. 4 proceeds as follows: first, the algorithm initializes row 0 and column 0 of the matrix $v[n,C]$ to zero. This is because the maximum gain that can be obtained by placing 0 objects is zero and the gain that can be obtained by limiting the cost to 0 is also nil. Then, in the outer for loop (for i=1 to n) the algorithm proceeds to tabulate row by row the matrix v, by computing the maximum gain that can be obtained by placing just one object, then two objects, and so on, and finally n objects. To perform this, the inner loop (for j=1 to C) iterates over all possible maximum costs from 1 to C; if the cost of the i-th object is less than the current maximum cost j, the algorithm considers the option of including the i-th object in the solution or not, depending on whether its inclusion will provide a better gain than not including it. To make this determination, the algorithm suffices to look-up in row i−1 of the matrix v the maximum gain obtainable by placing the first i−1 objects under a maximum cost limitation equal to the current cost limitation j minus the cost of item i and add to that the gain provided by object i. This is because one can extend a solution to the subproblem defined by the first i−1 objects and cost constraint j-ci by adding object i to it to obtain a valid solution to the initial problem. The gain achievable this way is compared with the gain obtainable by not including object i and having a maximum cost of j, which has already been computed on the row i−1 of the matrix v. The maximum of the two is recorded in the cell (i,j) of matrix v. If, on the other hand, the cost of item i is more than the maximum cost currently allowed (j), there is no other choice to be made but not including object i in the solution (it exceeds the maximum cost by itself). So, in that case, the maximum gain obtainable is equal to the maximum gain obtainable using only objects 1, . . . , i−1, which has already been computed on row i−1 of the matrix.

Once the output matrix is obtained, identifies a set of objects in an optimal placement. FIG. 5 shows an example of pseudo code illustrating this process. The algorithm described by the pseudocode in FIG. 5 constructs an optimal placement solution by examining the matrix v starting with the last row (first assignment i←−1) and last column (second assignment j←C). The algorithm initializes the solution set S to the empty set (S←empty set) and adds the object corresponding to the current row (i) to the solution S only if the computed maximum gain for the current cost limit is actually different from the computed maximum gain for the subproblem that does not consider object i (for the same cost limit). That is because this means that including object i actually provides a better solution than not considering it. Also, if object i is added to the solution, the cost limit is adjusted down by subtracting the cost $c_i$ of object i. Then, the algorithm moves on to the row above the current one (that is, row i−1), until the top row is reached. At that point, the complete solution is stored in set S.

In one embodiment, a greedy solution is used by the OPA 114 to determine optimal placement of the database objects. The greedy solution, in one embodiment, involves, computing the priority values of each database object. The priority value of the ith object is computed as:

$$\rho_i = \frac{\gamma_i}{c_i}. \qquad (2)$$

After this computation, the objects are sorted by their priority values in descending order, as shown in Table 3 below in the fourth column.

TABLE 3

| Object Name | Cumulative Space (MB) | Estimated Cumulative Gain (msec) | Priority Value |
|---|---|---|---|
| Supplier_IX | 5.5 | 47810 | 8767.45 |
| Supplier_Dat | 52.0 | 311734 | 5668.11 |
| Part_IX | 160.8 | 754627 | 4071.99 |
| Customer_Dat | 933.1 | 2658079 | 2464.54 |
| PartSupp_IX | 1014.7 | 2856596 | 2433.41 |
| Part_Dat | 1880.4 | 4171328 | 1518.68 |
| PartSupp_Dat | 5513.1 | 5186603 | 279.48 |
| Customer_IX | 6050.4 | 5326583 | 260.54 |
| Orders_IX | 6866.1 | 5336531 | 11.09 |

TABLE 3-continued

| Object Name | Cumulative Space (MB) | Estimated Cumulative Gain (msec) | Priority Value |
|---|---|---|---|
| LineItem_IX | 10895.4 | 5356578 | 5.19 |
| LineItems_Dat | 34654.0 | 5442382 | 3.61 |
| Orders_Dat | 39725.2 | 5452030 | 1.90 |

In this sorted list, the ith object is the ith best candidate that is recommended to be placed on the SSD. If c1 units of SSD space are planned to be purchased, the first object in the sorted list would be the best object to be moved to the SSD. If c1+c2 units of SSD space are purchased, the first and second objects in the list would be the most recommended objects to be moved to the SSD. Similarly, the ith object in the list should be placed on the SSD provided that there is enough space to move the objects with lower indices to the SSD. Considering the budget (the amount of SSD space) and estimated total improvement, a cut-off point in the list is determined. All of the objects falling above this cut-off point are moved to the SSD while the rest of the objects are kept on the HDD. An example of this is shown in FIG. 6.

Figure 6:
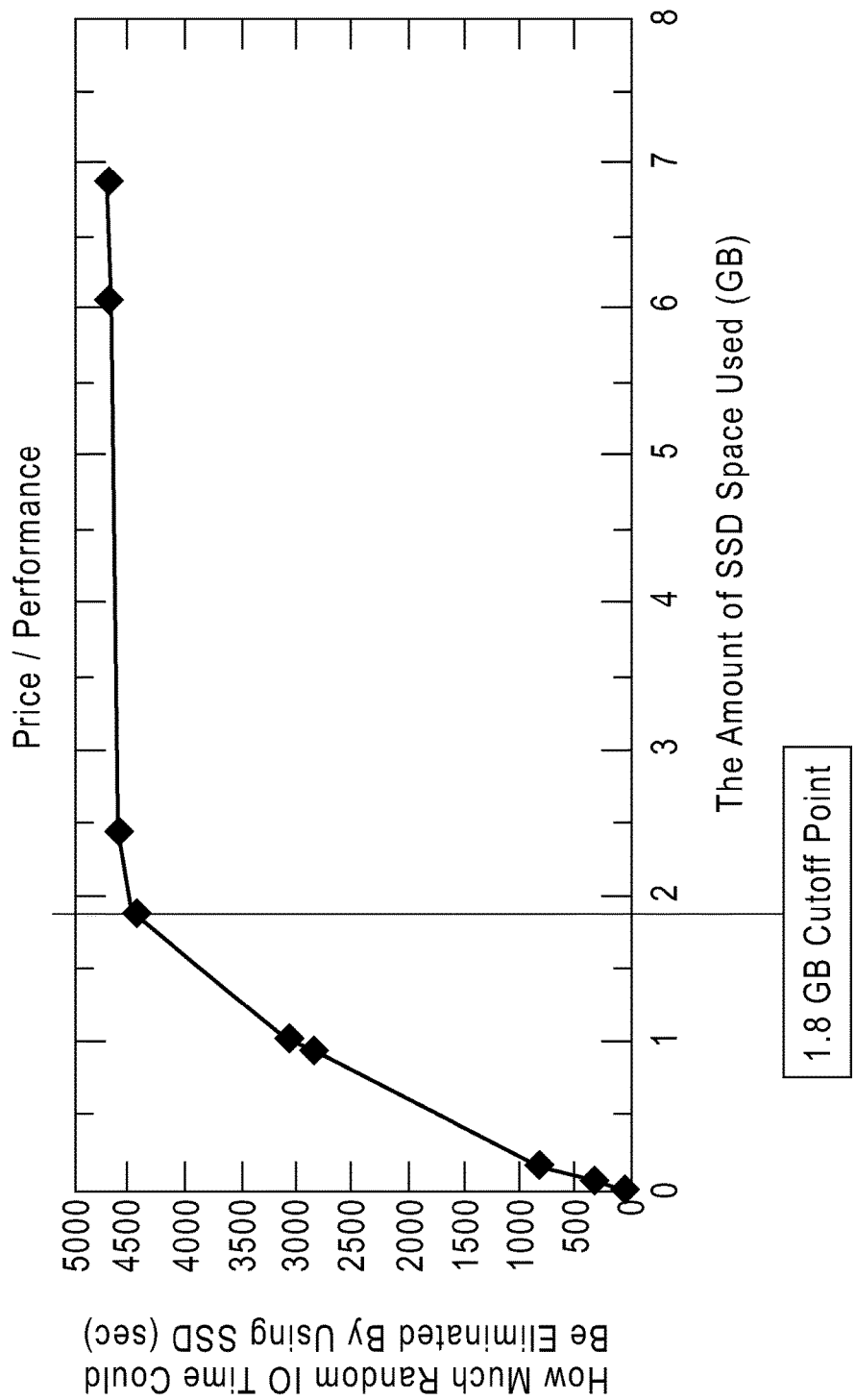
FIG. 6 is a graph illustrating the amount of random IO time that can be eliminated using a SSD vs the amount of SSD space used in GBs according to one embodiment of the present invention.

FIG. 6 is a graph displaying the amount of random IO time that can be eliminated using a SSD vs the amount of SSD space used in GBs. As can be seen a cut-off point 602 has been determined to be around 1.8 GB and anything after this cutoff point is placed on HDD devices.

As can be seen from the above discussion the various embodiments of the present invention determine optimal database object 110 placement among multiple storage devices 104, 106 comprising differing characteristics. The following is a summarization of the various embodiments discussed above. A typical query workload is performed on the current database which has all data objects 110 the same storage device 104 such as an HDD device. Once the workload has finished execution, the profiling information collected by the monitor 112 is analyzed by the OPA 114. Thus, the algorithm iterates over all database objects, calculating for each object its priority value from the input/output profiling information. The priority value formula takes into account both the projected execution time savings were this object to be moved to an SSD device and the total space occupied by this object. One example of a simple priority value formula is:

$$PriorityValue(Obj) = \frac{RandomAccesssTime(Obj)}{Space(Obj)} \quad (3)$$

where the RandomAccessTime variable is the total time that the data object was randomly accessed during the profiling process. The Space variable indicates how much storage space the object requires.

Figure 10:
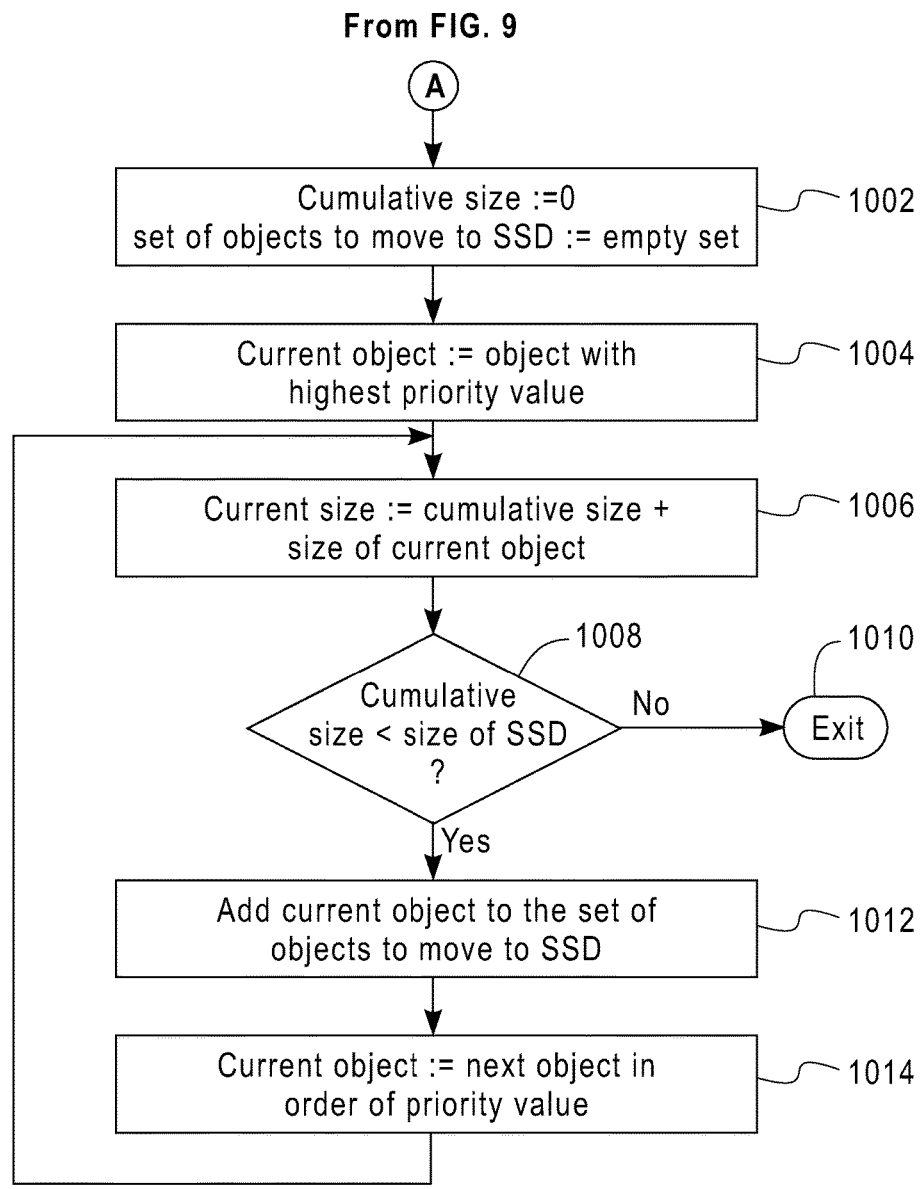
Figure 11:
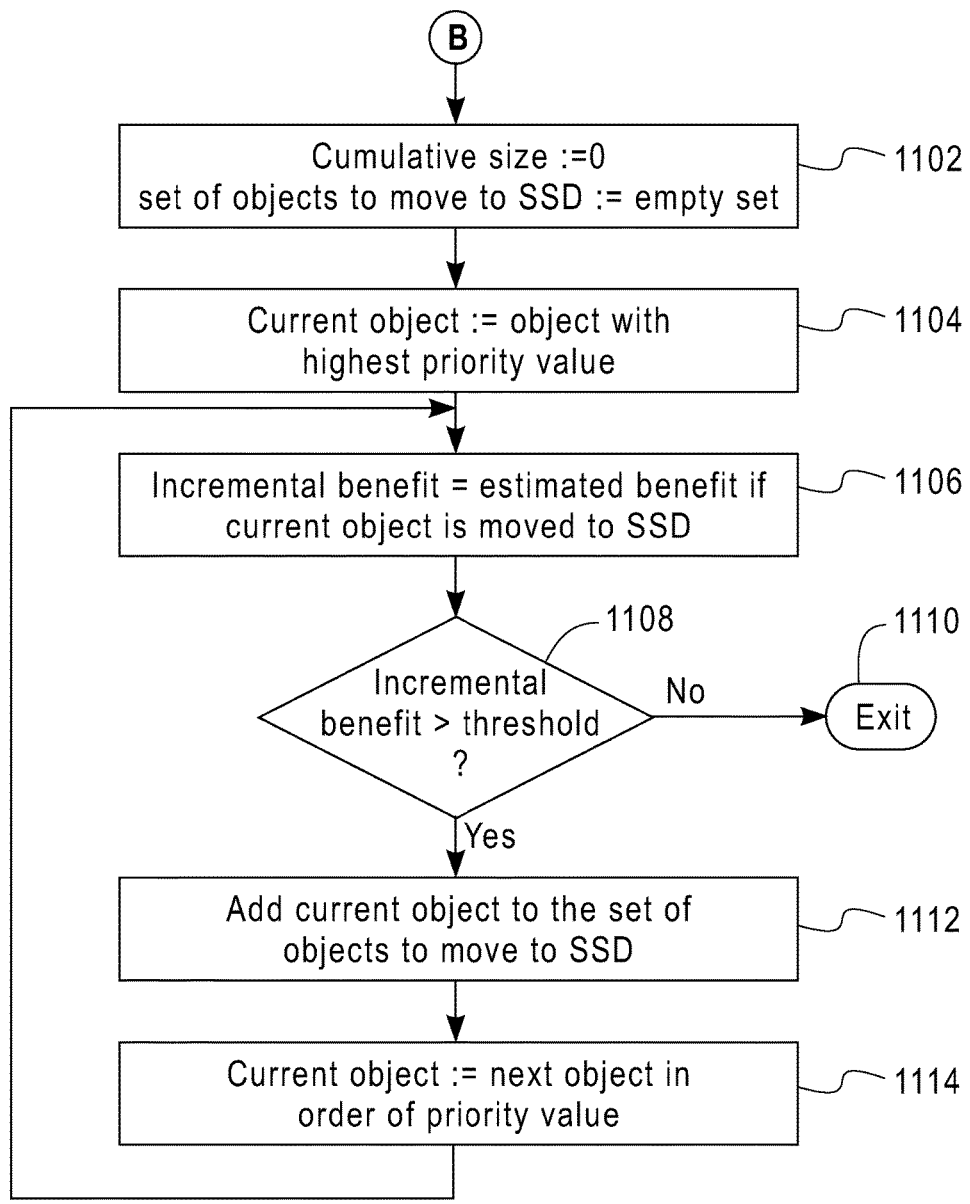

Another, more accurate priority value formula is:

$$Priority\_Value^{Obj} = \frac{Gain_{SSD}^{Obj}}{Storage\_Cost^{Obj}} \quad (EQ\ 4)$$

where:

$$Gain_{SSD}^{Obj} = NS_{HDD}^{Obj} * (AS_{HDD}^{Obj} - \alpha) + NR_{HDD}^{Obj} * (AR_{HDD}^{Obj} - \beta)$$

α=Average sequential access cost of a page on SSD
β=Average random access cost of a page on SSD
$NS_{HDD}^{Obj}$=Number of pages accessed sequentially when the object resides on HDD
$NR_{HDD}^{Obj}$=Number of pages accessed randomly when the object resides on HDD FIG. 7 shows the priority value 702 that has been determined for a set of database objects 110. FIG. 8 shows database objects 100 of FIG. 7 sorted by their priority value, in descending order. FIG. 6 shows a plot of the cumulative projected performance improvement vs. the cumulative space used by the objects in FIG. 8. As one can notice, after a certain point, moving more objects to the SSD provides diminishing returns. The cut-off point 602 can be decided either by the available capacity, if a specific SSD device is already selected (see FIG. 10) or, for capacity planning, by requiring that the incremental benefit is larger than a user specified threshold (see FIG. 11).

Operational Flows for Managing Database Object Placement

Figure 9:
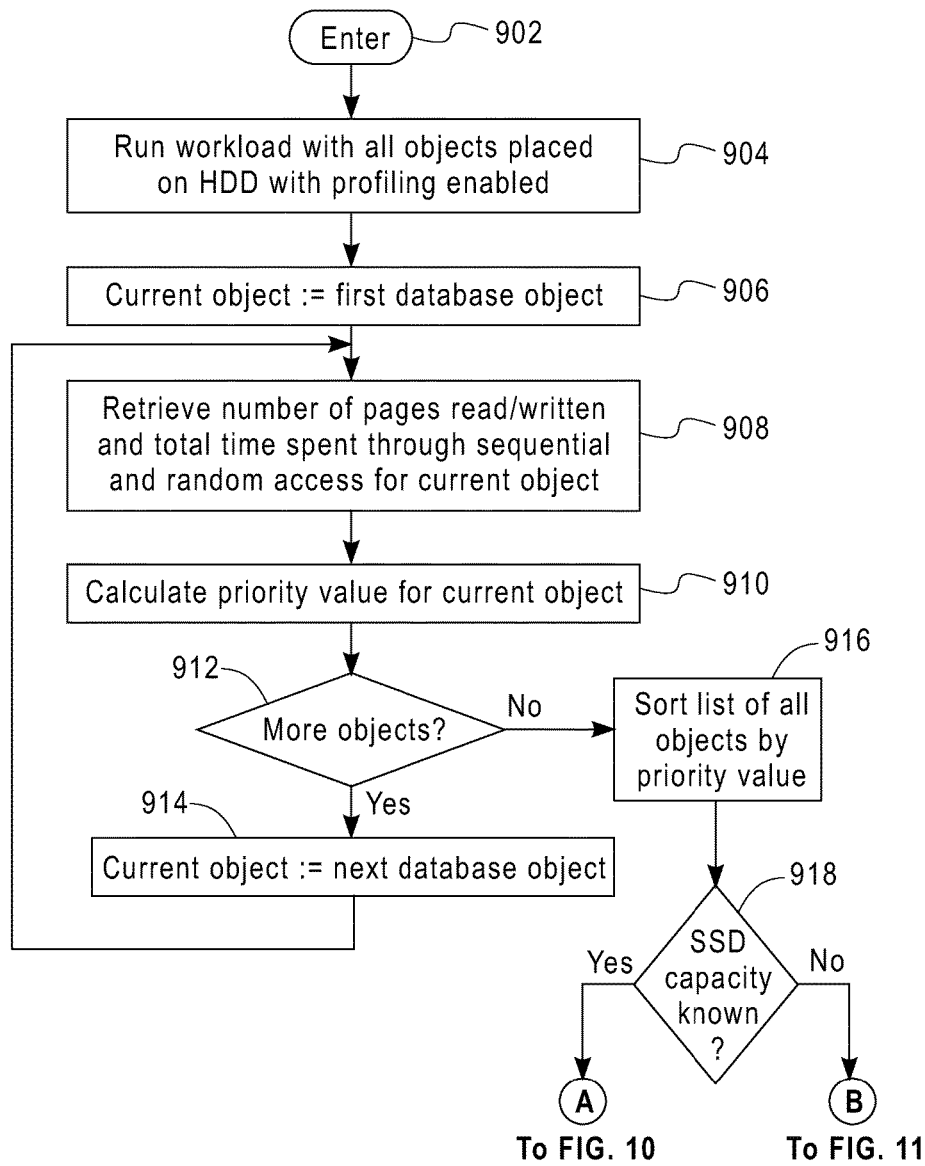
FIGS. 9-11 are operational flow diagrams illustrating a process for managing placement of database objects on storage devices comprising different characteristics according to one embodiment of the present invention.

FIG. 9 is an operational flow diagram illustrating one process for database object placement process one a plurality of storage devices such as one HDD and one SSD. The operational flow diagram of FIG. 9 begins at step 902 and flows directly to step 904. The database engine 111, at step 904, runs a workload with all object placed on a first storage device 104 such as an HDD with profiling enabled. Therefore, the monitor 112 reports detailed information about all physical input/output activity during the execution of a given workload. Examples of such information are the number and duration of all synchronous and asynchronous read and write operations for the database objects 110.

The OPA 114, at step 908, retrieves the number of pages read/written and total time spent through sequential and random access for current object. The OPA 114, at step 910, calculates a priority value for the current object based on the information retrieved at step 908. The OPA 114, at step 912, determines the there are any more data objects to calculate a priority for. If the result of this determination is positive, the OPA 114, at step 914, sets the current object to the next database object. The control flow then returns to step 908. If the result of this determination is negative, the OPA 114, at step 916, sorts the list of all objects by their priority value. The OPA 114, at step 918, determines if the capacity of the second storage device 106 such as a SSD is known. If the result of this determination is positive, the control flows to entry point A of FIG. 10. If the result of this determination is negative, the control flows to entry point B of FIG. 11.

If an SSD has already been selected (e.g., the capacity is known) the OPA 114, at step 1002, initially sets the cumulative size of the objects to 0 and the set of objects to move to SSD device 106 to an empty set. The OPA 114, at step 1004, sets the current object to the object with the highest priority. The OPA 114, at step 1006, sets the cumulative size equal to the cumulative size plus the size of the current object (e.g., the amount of storage space the object requires). The OPA 114, at step 1008, determines if the cumulative size of the objects that are to be potentially moved to the SSD 106 is less than the capacity of the SSD 106. If the result of this determination is negative, the control flow exits at step 1010. If the result of this determination is positive, the OPA 114, at step 1012, adds the current object to the set of objects to be moved to the SSD 106. The OPA 114, at step 1014, the sets the current object equal to the next object in order of priority value. The control flow then returns to step 1006. This process continues until the cumulative size is greater than the capacity of the SSD 106.

If the determination at step 918 is negative, the OPA 114, at step 1102 initially sets the cumulative size to 0 and the set of objects to move to the SSD 106 to an empty set. The OPA 114, at step 1104, sets the current object equal to the object with the highest priority value. The OPA 114, sets the incremental benefit equal to an estimated benefit if the current object is moved to an SSD. The OPA 114, at step 1108, determines if the incremental benefit is greater than a given threshold. If the result of this determination is negative, the control flow exits at step 1110. If the result of this determination is positive, the OPA 114, at step 1112, adds the current object to the set of objects that are to be moved to an SSD. The OPA 114, at step 1114, sets the sets the current object equal to the next object in order of priority value. The control flow then returns to step 1106. This process continues until the incremental benefit is not greater than the given threshold.

Figure 12:
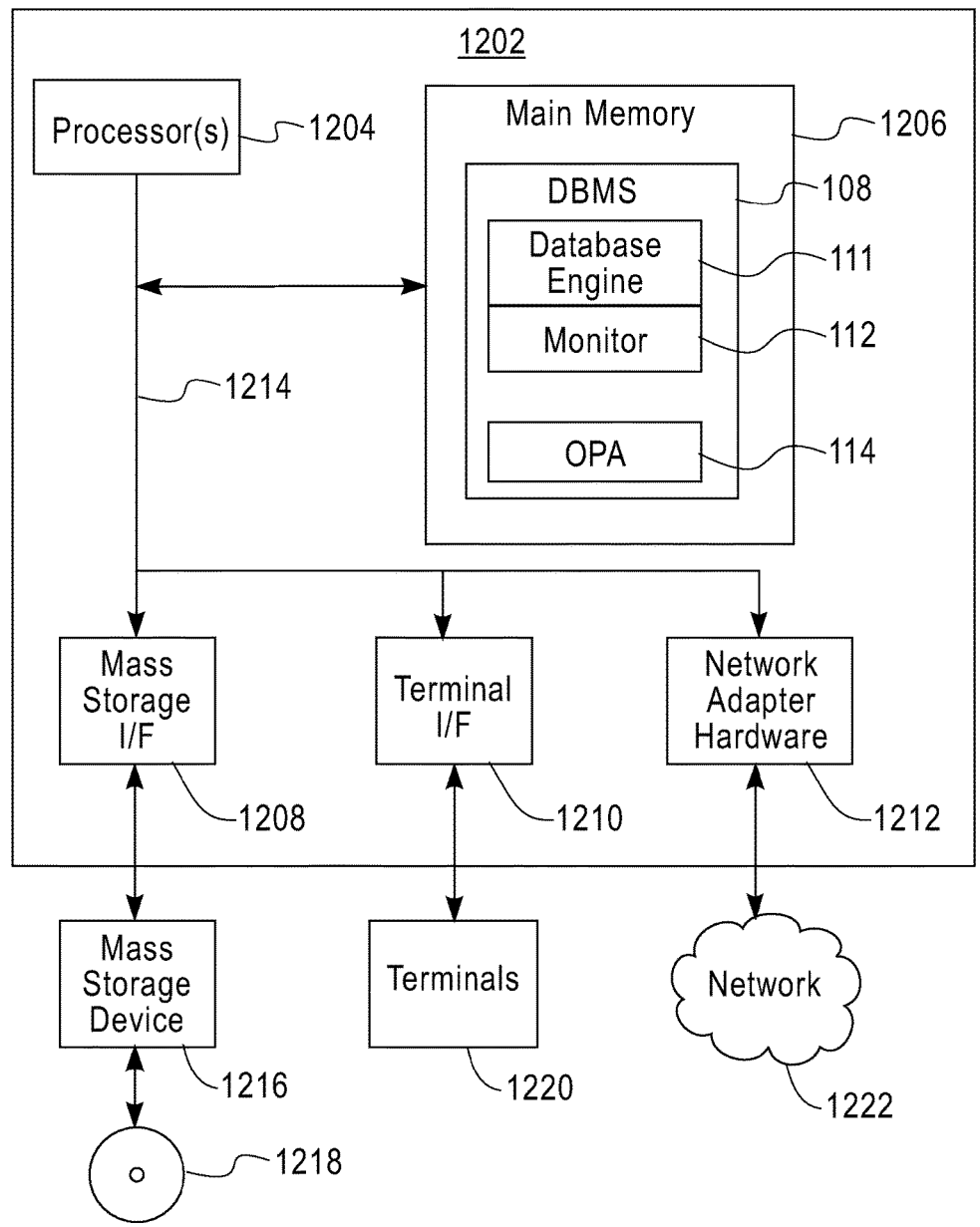
FIG. 12 is a block diagram illustrating a detailed view of an information processing system according to one embodiment of the present invention.

FIG. 12 is an operational flow illustrating another process for managing the placement of database objects on storage devices with differing characteristics. The operational flow in FIG. 12 beings at step 1202 and flows directly to step 1204.

Information Processing System

FIG. 12 is a block diagram illustrating a more detailed view of the information processing system 102 according to one embodiment of the present invention. The information processing system 102 is based upon a suitably configured processing system adapted to implement the exemplary embodiment of the present invention. Any suitably configured processing system is similarly able to be used as the information processing system 102 by embodiments of the present invention such as an information processing system residing in the computing environment of FIG. 1, a personal computer, workstation, or the like.

The information processing system 102 includes a computer 1202. The computer 1202 has a processor(s) 1204 that is connected to a main memory 1206, mass storage interface 1208, terminal interface 1210, and network adapter hardware 1212. A system bus 1214 interconnects these system components. The mass storage interface 1208 is used to connect mass storage devices, such as data storage device 1216, to the information processing system 102. One specific type of data storage device is an optical drive such as a CD/DVD drive, which may be used to store data to and read data from a computer readable medium or storage product such as (but not limited to) a CD/DVD 1218. Another type of data storage device is a data storage device configured to support, for example, NTFS type file system operations.

The main memory 1206, in one embodiment, comprises the DBMS 108, the database engine 111, the monitor 112, and the object placement advisor 114. Although illustrated as concurrently resident in the main memory 206, it is clear that respective components of the main memory 1206 are not required to be completely resident in the main memory 206 at all times or even at the same time. In one embodiment, the information processing system 102 utilizes conventional virtual addressing mechanisms to allow programs to behave as if they have access to a large, single storage entity, referred to herein as a computer system memory, instead of access to multiple, smaller storage entities such as the main memory 1206 and data storage device 1216. Note that the term "computer system memory" is used herein to generically refer to the entire virtual memory of the information processing system 102.

Although only one CPU 1204 is illustrated for computer 1202, computer systems with multiple CPUs can be used equally effectively. Embodiments of the present invention further incorporate interfaces that each includes separate, fully programmed microprocessors that are used to off-load processing from the CPU 1204. Terminal interface 1210 is used to directly connect one or more terminals 1220 to computer 1202 to provide a user interface to the computer 1202. These terminals 1220, which are able to be non-intelligent or fully programmable workstations, are used to allow system administrators and users to communicate with the information processing system 102. The terminal 1220 is also able to consist of user interface and peripheral devices that are connected to computer 1202 and controlled by terminal interface hardware included in the terminal I/F 1210 that includes video adapters and interfaces for keyboards, pointing devices, and the like.

An operating system (not shown) included in the main memory is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 102. The network adapter hardware 1212 is used to provide an interface to a network 1222. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via CD or DVD, e.g. CD 1218, CD ROM, or other form of recordable media, or via any type of electronic transmission mechanism.

Non-Limiting Examples

The present invention can be realized in hardware, software, or a combination of hardware and software. A system according to one embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for optimizing placement of database objects on a plurality of storage devices, the method comprising:
    placing a set of database objects on a first storage device in a plurality of storage devices, wherein each storage device in the plurality of storage device comprises differing characteristics;
    running a query workload on the set of database objects that have been placed on the first storage device;
    collecting profiling information associated with the query workload that is running;
    determining, based on collecting the profiling information, at least a number of pages read and written for each database object in the set of database objects;
    selecting, based on the profiling information that has been collected, a subset of database objects from the set of the database objects to be stored on a second storage device in the plurality of storage devices; and
    storing the subset of database objects on the second storage device and all remaining database objects in the set of database objects on the first storage device.

2. The method of claim 1, wherein the first storage device is a hard disk drive and the second storage device is a solid state disk.

3. The method of claim 1, wherein the profiling information includes information associated with physical input and output activity of the database objects.

4. The method of claim 3, wherein the physical input and output activity includes a total number and total duration of all synchronous and asynchronous read and write operations for each database object in the set of database objects.

5. The method of claim 1, wherein the selecting further comprises:
    associating a value with each database object based on at least one aspect of the profiling information that has been collected;
    sorting each database object in the set of database object based on the value associated therewith; and
    selecting the first given number of database objects that have been sorted.

6. The method of claim 1, wherein the subset of database objects is selected based on a capacity of the second storage device.

7. The method of claim 1, where the subset of database objects is selected based on an incremental benefit of storing database objects on the second storage device falls below a given user-defined threshold.

8. An information processing system for optimizing placement of database objects on a plurality of storage devices, the information processing system comprising:
    a memory;
    a processor communicatively coupled to the memory; and
    a database object placement advisor communicatively coupled to the memory and the processor, wherein the database object placement advisor is adapted to:
    place a set of database objects on a first storage device in a plurality of storage devices, wherein each storage device in the plurality of storage device comprises differing characteristics;
    run a query workload on the set of database objects that have been placed on the first storage device;
    collect profiling information associated with the query workload that is running;
    determine, based on collecting the profiling information, at least a number of pages read and written for each database object in the set of database objects;
    select, based on the profiling information that has been collected, a subset of database objects from the set of the database objects to be stored on a second storage device in the plurality of storage devices; and
    store the subset of database objects on the second storage device and all remaining database objects in the set of database objects on the first storage device.

9. The information processing system of claim 8, wherein the first storage device is a hard disk drive and the second storage device is a solid state disk.

10. The information processing system of claim 8, wherein the profiling information includes information associated with physical input and output activity of the database objects.

11. The information processing system of claim 10, wherein the physical input and output activity includes a total number and total duration of all synchronous and asynchronous read and write operations for each database object in the set of database objects.

12. The information processing system of claim 8, wherein the database object placement advisor is further adapted to select by:
    associating a value with each database object based on at least one aspect of the profiling information that has been collected;
    sorting each database object in the set of database object based on the value associated therewith; and
    selecting the first given number of database objects that have been sorted.

13. The information processing system of claim 8, wherein the subset of database objects is selected based on a capacity of the second storage device.

14. The information processing system of claim 8, where the subset of database objects is selected based on an incremental benefit of storing database objects on the second storage device falls below a given user-defined threshold.

15. A non-transitory computer program storage product for optimizing placement of database objects on a plurality of storage devices, the non-transitory computer program storage product comprising instructions for:
    placing a set of database objects on a first storage device in a plurality of storage devices, wherein each storage device in the plurality of storage device comprises differing characteristics;
    running a query workload on the set of database objects that have been placed on the first storage device;
    collecting profiling information associated with the query workload that is running;
    determining, based on collecting the profiling information, at least a number of pages read and written for each database object in the set of database objects;

selecting, based on the profiling information that has been collected, a subset of database objects from the set of the database objects to be stored on a second storage device in the plurality of storage devices; and storing the subset of database objects on the second storage device and all remaining database objects in the set of database objects on the first storage device.

16. The non-transitory computer program storage product of claim 15, wherein the first storage device is a hard disk drive and the second storage device is a solid state disk.

17. The non-transitory computer program storage product of claim 15, wherein the profiling information includes information associated with physical input and output activity of the database objects.

18. The non-transitory computer program storage product of claim 15, wherein the instructions for selecting further comprise instructions for:

associating a value with each database object based on at least one aspect of the profiling information that has been collected;

sorting each database object in the set of database object based on the value associated therewith; and selecting the first given number of database objects that have been sorted.

19. The non-transitory computer program storage product of claim 15, wherein the subset of database objects is selected based on a capacity of the second storage device.

20. The non-transitory computer program storage product of claim 15, where the subset of database objects is selected based on an incremental benefit of storing database objects on the second storage device falls below a given user-defined threshold.

* * * * *